R. F. E. OKRASSA.
MEANS FOR COOLING INTERNAL COMBUSTION ENGINES.
APPLICATION FILED MAY 13, 1910.
1,003,290.
Patented Sept. 12, 1911.
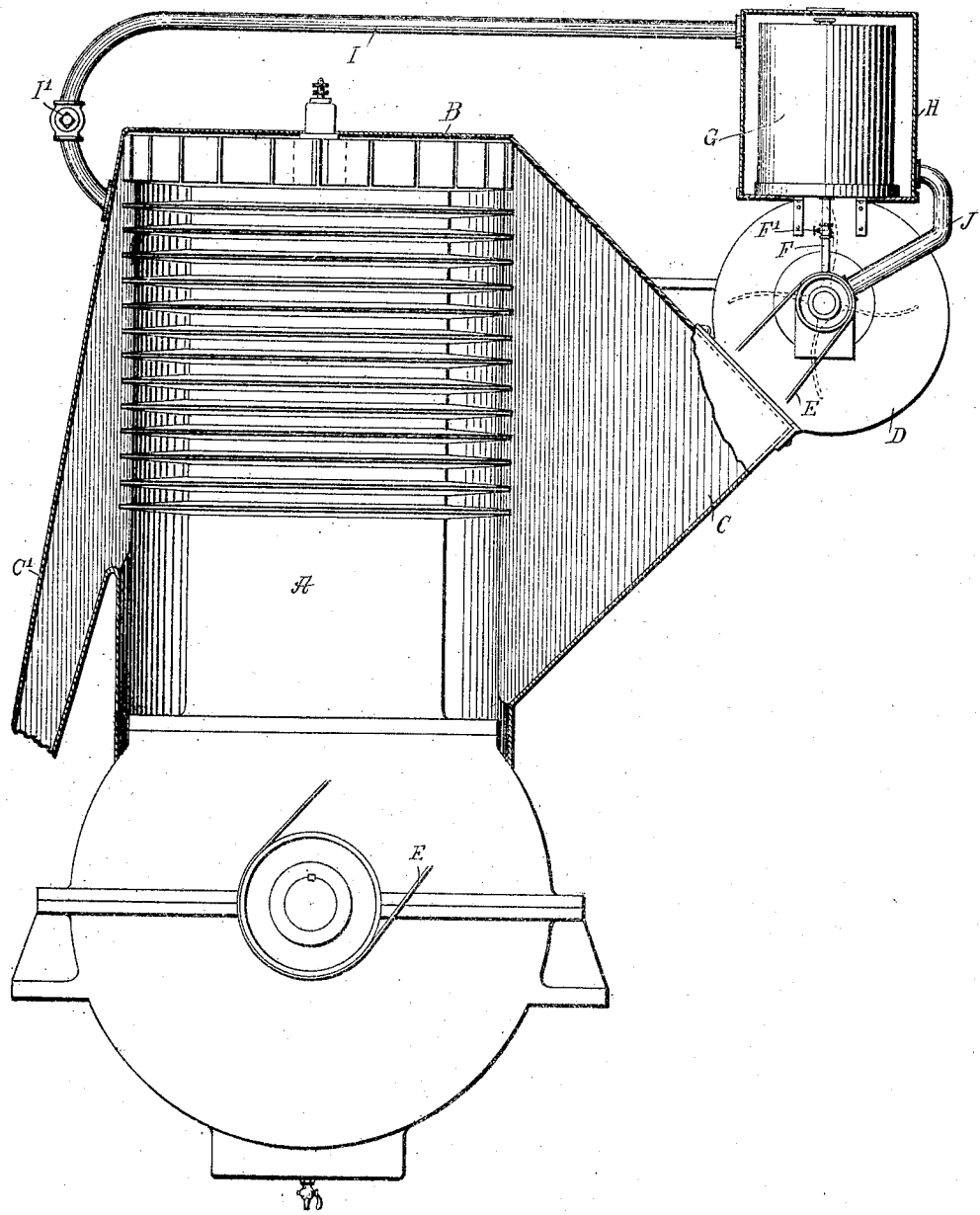
WITNESSES:
INVENTOR
Roberto Fritz Emil Okrassa
BY
ATTORNEYS

UNITED STATES PATENT OFFICE.

ROBERTO FRITZ EMIL OKRASSA, OF ANTIGUA, GUATEMALA.

MEANS FOR COOLING INTERNAL-COMBUSTION ENGINES.

1,003,290.      Specification of Letters Patent.      Patented Sept. 12, 1911.

Application filed May 13, 1910. Serial No. 561,115.

*To all whom it may concern:*

Be it known that I, ROBERTO FRITZ EMIL OKRASSA, a subject of the German Emperor and King of Prussia, and a resident of Antigua, Guatemala, Central America, have invented a new and Improved Means for Cooling Internal-Combustion Engines, of which the following is a full, clear, and exact description.

The object of the invention is to provide a new and improved means for cooling internal combustion engines, in a very simple and economical manner, and for this purpose use is made of moistened air moved in contact with the cylinder of the engine.

A practical embodiment of the invention is represented in the accompanying drawing forming a part of this specification, in which the figure is a sectional side elevation of means employed for cooling the engine cylinder by moistened air.

The cylinder A, of an internal combustion engine of any approved construction, is surrounded by a mantle B provided with an inlet C connected with the discharge end of a blower D, adapted to be driven from the shaft of the engine by a suitable connection E, such as a belt and pulleys or the like. Into the air inlet of the blower D extends a pipe F, having a valve F', and connected with a tank G containing water, so that water in small quantities, that is, drop by drop, can be fed into the air inlet of the blower D, to mix with the air and thus moisten the same, the moistened air being discharged by the blower D into the mantle B and circulated through the space between the exterior surface of the cylinder A and the mantle B. The moistened air, in coming in contact with the surface of the cylinder A readily cools the same, as the moistened air can take up a large quantity of heat radiating from the cylinder A, thus quickly cooling the same. The amount of water flowing from the water tank G to the air inlet of the blower D can be regulated to a nicety, by the operator adjusting the valve F' correspondingly. The mantle B is provided with an outlet C', preferably located diametrically opposite the inlet C, so that the heated air readily escapes from the mantle B after having cooled the cylinder A in its passage over the exterior surface thereof.

In order to prevent freezing of the water in the tank G, the latter is contained in a casing H connected by a pipe I with the mantle B, preferably near the upper end thereof, so that a portion of the heated air within the mantle B can pass by way of the pipe I into the casing H, to heat the water tank G and the water contained therein, with a view to prevent the water from freezing. A pipe J leads from the casing H to the air inlet of the blower D, so that the air is drawn into the blower D and forced out of the same into the inlet C and the mantle B. A valve I' in the pipe I serves to regulate the amount of heated air passing from the mantle B to the casing H.

As shown in Fig. 1, the cylinder A is provided with the usual external ribs, but I do not limit myself to any particular construction of cylinder, as the same may be varied without deviating from my invention.

Having thus described my invention, I claim as new and desire to secure by Letters Patent:

1. In combination, a cylinder of an internal combustion engine, a reservoir for containing water, a blower for receiving water in minute quantities from the said reservoir to form moistened air, a mantle around the cylinder and connected with the discharge end of the said blower, so that moistened air is forced through the space between the cylinder wall and the mantle and a casing inclosing the said reservoir and communicating with the mantle and with the said blower.

2. In combination, a cylinder of an internal combustion engine, a reservoir for containing water, a blower for receiving water in minute quantities from the said reservoir to form moistened air, a mantle around the cylinder and connected with the discharge end of the said blower so that moistened air is forced through the space between the cylinder wall and the mantle, a casing inclosing the said water tank, a pipe connecting the said mantle with the said casing, and a pipe connecting the said casing with the said blower.

3. In combination, a cylinder of an internal combustion engine, a reservoir for containing water a blower for receiving water in minute quantities from the said reservoir to form moistened air a mantle around the cylinder and receiving the moistened air from the blower to cool the cylinder, a casing inclosing the reservoir and communicating with the blower, means for establishing communication between the mantle and the said casing.

4. In combination, a cylinder of an internal combustion engine, a reservoir for containing water, a blower, a valve controlled pipe connecting the reservoir with the air inlet of the blower, a mantle around the cylinder and provided with an inlet connected with the discharge end of the blower, the said mantle having an outlet, a casing inclosing the said reservoir and communicating with the air inlet of the blower, and a valve-controlled pipe connecting the mantle with said casing.

In testimony whereof I have signed my name to this specification in the presence of two subscribing witnesses.

ROBERTO FRITZ EMIL OKRASSÁ.

Witnesses:
 AUGUSTO SCHAROCH,
 F. BOTTE.